(12) United States Patent
Mokady et al.

(10) Patent No.: US 11,721,332 B1
(45) Date of Patent: Aug. 8, 2023

(54) MODIFYING FOLLOW ON ACTIONS BASED ON USER ACTIVITY

(71) Applicant: Amazon Technologies, Inc., Seattle, WA (US)

(72) Inventors: Ran Mokady, London (GB); Kris Jones, Suffolk (GB); Vishnu Vijay, London (GB); Mark Elliott, Peterborough (GB); John Stephen Mintoft, Haslemere (GB)

(73) Assignee: AMAZON TECHNOLOGIES, INC., Reno, NV (US)

( * ) Notice: Subject to any disclaimer, the term of this patent is extended or adjusted under 35 U.S.C. 154(b) by 304 days.

(21) Appl. No.: 16/860,299

(22) Filed: Apr. 28, 2020

(51) Int. Cl.
| | |
|---|---|
| *G06Q 30/0601* | (2023.01) |
| *G10L 15/22* | (2006.01) |
| *G06F 3/16* | (2006.01) |
| *G06F 16/9032* | (2019.01) |
| *G06Q 20/12* | (2012.01) |
| *H04W 68/00* | (2009.01) |
| *H04W 4/40* | (2018.01) |

(52) U.S. Cl.
CPC ............... *G10L 15/22* (2013.01); *G06F 3/167* (2013.01); *G06F 16/90332* (2019.01); *G06Q 20/12* (2013.01); *G06Q 30/0601* (2013.01); *H04W 4/40* (2018.02); *H04W 68/005* (2013.01); *B60K 2370/736* (2019.05); *G10L 2015/223* (2013.01)

(58) Field of Classification Search
CPC ............... B60K 2370/736; B60K 2370/739; G06Q 30/06
See application file for complete search history.

(56) References Cited

U.S. PATENT DOCUMENTS

| | | | | |
|---|---|---|---|---|
| 6,181,996 | B1* | 1/2001 | Chou et al. ............ | G01C 21/36 340/439 |
| 2001/0054108 | A1* | 12/2001 | Lincoln et al. .... | H04Q 11/0067 709/236 |
| 2003/0202017 | A1* | 10/2003 | Fukuoka et al. ....... | G06Q 30/06 715/809 |
| 2012/0259882 | A1* | 10/2012 | Thakur et al. ...... | G06F 16/9535 707/E17.074 |

* cited by examiner

*Primary Examiner* — Feng-Tzer Tzeng
(74) *Attorney, Agent, or Firm* — Hogan Lovells US LLP

(57) ABSTRACT

In various embodiments, a voice command is transmitted while the user is performing an activity. The user's activity is determined, along with follow on actions for the request. If the user is performing an interaction-limiting activity, subsequent actions may be presented in a simplified display to reduce the likelihood that user interacts with the display. Additionally, certain follow on actions may be considered complex. If a complex follow on action occurs during an interaction-limiting activity, the request may be flagged and delayed until the user has completed the interaction-limiting activity.

20 Claims, 10 Drawing Sheets

MODIFYING FOLLOW ON ACTIONS BASED ON USER ACTIVITY

BACKGROUND

Smart devices and digital assistants are able to help users with many tasks. In particular, voice-based control has become a popular and convenient way of interacting with such devices. This allows users to interact with the devices without having to hold or touch them or having to navigate through a graphic interface. It is even possible for users to online shop through voice interactions. For example, a user could provide a voice command such as "add diet cola to cart", and such an item would be added to their online shopping cart associated with the device. These devices are now being integrated into locations outside of a user's home, such as within vehicles. In some cases, the digital assistant may request additional information when receiving a command from a user, however, making this request may be undesirable if a user is operating a vehicle, thus causing friction in the purchasing process and user experience.

BRIEF DESCRIPTION OF THE DRAWINGS

Various embodiments in accordance with the present disclosure will be described with reference to the drawings, in which.

DETAILED DESCRIPTION

Figure 1:
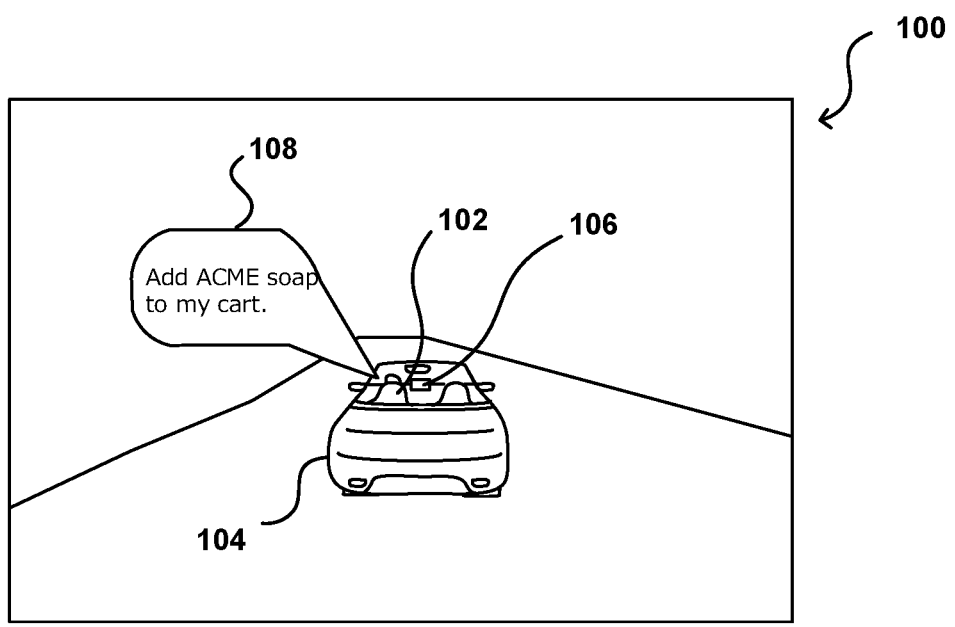
FIG. 1 illustrates an example of performing e-commerce operations over voice control, in accordance with example embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. Systems and methods in accordance with various embodiments of the present disclosure may overcome one or more of the aforementioned and other deficiencies experienced in conventional approaches for voice control technology. In particular, various embodiments are directed to incorporating voice control technology in automobiles where a user, interacting with the voice control technology, is operating the automobile.

In various embodiments, a user may utter a voice directive that is detected and picked up by a voice-enabled electronic device as an "utterance." The utterance is then processed either on the device or transmitted to a remote server for processing. Specifically, the utterance undergoes an automatic speech recognition (ASR) process, wherein the utterance text is determined. In some embodiments, it may be determined that the utterance is related to a certain type of request. This may be done by detecting for certain keywords, sentence structure, vocal tone, among other information provided in the utterance. For example, it may be determined that the utterance is related to shopping, for example, when the user says words such as "cart" or "shopping list." Alternatively, the utterance may be determined to be an information request, a device control input, or the like. In some embodiments, the utterance may then be processed in the context of that type of request, with specific attention paid to a user's current activity status when the request is received. This may include employing a natural language understanding (NLU) and/or name entity recognition (NER) framework specific to that type of request, as well as integrating various sensors to determine physical characteristics of the user at the time of the request.

In some embodiments, each type of request is associated with a plurality of processing steps to be performed. Thus, the present request is associated with a plurality of processing steps. The plurality of processing steps may include analysis of the utterance text using a language-understanding framework associated with the type of request, generating and selecting a search query from the utterance text, conducting a search of database of items using a search query. The plurality of processing steps may include additional or different steps, depending on the type of the request. In performing one or more of these processing steps, it may be determined that additional information or follow on actions may be necessary or helpful to the user. An example of additional information may be asking a user to select a quantity of an item to add to a shopping list. Additionally, an example of follow on actions may be to request a user review and confirm a shopping list before check out. However, these actions may be deemed as too intrusive in certain environments or situations, such as when the user is operating a vehicle, such as an automobile, motorcycle, scooter, bicycle, or the like. For example, the follow on actions may cause the user to temporary look away from the road, which may be undesirable. Thus, it would be advantageous to provide the user with an indication that the action or request was received and to provide a request to complete the follow on action at a later time, such as when the user to no longer operating the vehicle.

Various different methods or models may be developed to determine whether to request feedback from a user at a current time or to wait for follow on actions at a later time. For example, a database may be established where consumer behavior (e.g., anonymized consumer behavior) evaluates actions after particular requests. If a majority of users perform one or more actions after making the request, that action may be deemed as a likely response, and may further be analyzed with respect to a given condition of the user, such as operating a vehicle. As a result, a request that is associated with a follow on action that is undesirable when a user is operating a vehicle may be categorized as an action that provides a later indication and the request. Additionally, various other methods may be incorporated such as analyzing the utterance to determine a length (e.g., length of time speaking, length of sense or words used, etc.) or quantity of information provided. Lengths or quantities over a threshold may be deemed appropriate for later action. Furthermore, in various embodiments, the user's actions over time may be aggregated to provide the appropriate action. Additionally, in embodiments, a level of response may be cataloged. For example, if the user's utterance requests review that may be associated with looking at a display, that action may be categorized as a delayed follow on action (e.g., an action that waits until after the user is no longer operating the vehicle). However, if the response is a yes/no response (e.g., "Did you ask for bananas?"), then the request may be provided while the user is operating the vehicle. In this manner, embodiments are directed toward determining how to respond to the user's utterance based, at least in part, on the user's present activity.

In some embodiments, a user's current activity (e.g., driving a vehicle) may be determined by one or more indicators that may be received by a user device. Upon providing permission to an application executing on a user device and/or vehicle operating system, various information may be provided to a server to analyze a user's likely current action. For example, a user device that is currently connected to a car's BLUETOOTH™ may be indicative of the user being in a car. Additionally, sensors within a user device may provide information regarding a current speed of the user, which may be faster than a user could travel without the assistance of a machine. Moreover, the user may provide an indication, such as selecting an option or turning the device to "car mode." As a result, upon being granted permission to access the information, the server may determine the current activity of the user is associated with operating a vehicle and then modify the user's experience with one or more applications. For example, a shopping application may provide different experiences when the user is operating a vehicle than when the user is at home. By way of example only, the experience associated with the vehicle may be designed to reduce user interaction with a display and/or provide more auditory indicators than visual indicators to discourage the user from looking at the display. Upon determining the user is no longer operating the vehicle, the experience may revert to a more interactive experience, where follow on actions may be performed and purchases, among other actions, may be completed.

FIG. 1 illustrates an example environment 100 where a user 102 is operating a vehicle 104. A user device 106 (e.g., computing device, mobile device, device, personal device, smart phone, etc.) is positioned within the vehicle 104 and may, in various embodiments, be positioned in communication with one or more components of the vehicle 104, such as the stereo system, navigation systems, and the like. For example, the user device 106 may be connected to the vehicle 104 through a wireless connection, such as via BLUETOOTH™, or may be physically coupled to the vehicle 104 through a cord or the like. Furthermore, it should be appreciated that embodiments of the present disclosure may also be integrated into an operating system associated with the vehicle 104.

In various embodiments, the user device 106 is a voice-enabled communications device. A voice-enable communications device includes, for example, any device having a microphone or other component configured to generate audio data from sound in the frequency range in which humans communicate. Although the illustrated user device 106 is a smart phone, it should be understood that the device 106 may be various other types of electronic devices that are capable of outputting audio and which have audio playback controls. These devices can include, for example, speakers, receivers, notebook computers, ultrabooks, personal data assistants, video gaming consoles, televisions, set top boxes, smart televisions, portable media players, unmanned devices (e.g., drones or autonomous vehicles), wearable computers (e.g., smart watches, smart glasses, bracelets, etc.), display screens, display-less devices, virtual reality headsets, display-enabled devices, smart furniture, smart household devices, smart vehicles, smart transportation devices, and/or smart accessories, among others. The device 106 can communicate with a server over at least one network, such as the Internet, a cellular network, a local area network (LAN), an Ethernet, Wi-Fi, or a dedicated network, among other such options.

In various embodiments, the user device 106 may execute an application that incorporates a digital assistant that utilizes a wakeword or other predetermined sound profile or action to activate some functionality (e.g., send data to a remote device, such as audio input data for speech analysis) as well as button-activated devices that utilize a button (graphical, physical, or both) to enable some audio-related functionality (e.g., a sound-capturing and sending mode). In this example, the user 102 can speak a request 108 (e.g., an "utterance") within an environment where the user device 106 is located. The request may be any question, inquiry, instruction, phrase, or other set of one or more words/sounds. For example, the user 102 in FIG. 1 is saying "Add ACME soap to my cart." It should be appreciated that, in various embodiments, the request 108 may be prefaced with the user uttering the wakeword, which may also be referred to herein as an activation word. In particular, a wakeword may be detected within audio input data detected by one or more microphones located on the voice-enabled communications device. Persons of ordinary skill in the art will recognize, however, that the one or more microphones may alternatively be located on a separate device in communication with the voice-enabled communications device. In some embodiments, after the wakeword is detected, the voice-enabled communications device may begin interpreting/analyzing audio input data until no more speech is detected.

In general, when the application associated with the digital assistant is active, the user device 106 constantly listens for the wakeword and is otherwise inactive. Once the wakeword is recognized, the voice-enabled communications device switches from a passive mode to an active mode. It should be noted that the wakeword does not have to be the first word or sound in a given sentence or request. The voice-enabled communications device can be configured such that it can record and store a limited amount of audio input data that should, in most instances, is the amount of time needed to speak a sentence or more. Accordingly, even if a wakeword is recognized in the middle or end of a sentence, the voice-enabled communications device will have retained the entire sentence, which can then be analyzed by backend servers to determine what is being requested.

An application executing on the voice-enabled communications device or otherwise in communication with the voice-enabled communications device, can analyze the user's speech that includes audio input data to perform at least one function. The functions can include, for example, answering questions, playing music, reading audiobooks, controlling connected devices via voice commands/instructions, sending an electronic message, initiating a phone call, performing an online shopping action, among other such functions.

In this example, the user 102 is utilizing an online shopping function associated with the user device 106. For example, the user device 106 may be executing an application that enables online shopping, where the user 102 is logged into an account, where the user can purchase or otherwise select items from an electronic catalog of times. The account may already be associated with information such as a payment method (e.g., credit card number), shipping address, billing address, and any other information needed to complete a transaction. Conventionally, the user would user a client device with a display such as a personal computer or smart phone to log onto a website to access the e-commerce platform. The user can then browse through the offerings or search using a keyword query to located products of interest. The user can perform various actions such as finding out information about a product, adding a product to cart, removing a product from cart, checking out, and the like. Typically information is output to the user visually through the graphic interface that is displayed on the display of the device and user inputs are entered manually via a peripheral device such as a mouse or keyboard. However, this conventional approach is undesirable in the current environment 100 because the user is operating the vehicle 104. As a result, actions that cause the user 102 to focus on the user device 106 instead of the road are unwanted. However, utilizing voice control technology and embodiments of the present disclosure, the user 102 can do these or similar actions while operating the vehicle 104.

In this example, the user 102 may say "Add ACME soap to my cart," as indicated in the request 108. In response to the request 108, the soap is added to an electronic shopping cart associated with an e-commerce platform accessible via the user device 106, among other devices. In this example, the user account can be associated with a user profile. The user profile may include information such as demographic information and previous behaviors. The previous behaviors may include many types of information, such as product browsing history, purchase history, past utterances and associated actions and results, among other information. It should be noted that other approaches can be implemented to login to a particular profile. For example, each profile may be logged into by, for example, saying the wakeword then a special keyword/phrase (e.g., sign in as Jane) and/or by biometrics (i.e., speaker identification based on sound of voice and, if camera is available, facial recognition or, if fingerprint scanner, fingerprint ID), among other such approaches.

In some embodiments, the contents of the audio input data are essentially streamed to a backend server such that at least a portion of the audio input data can be received by the backend server and analysis can begin on that portion and any subsequent portions immediately upon receipt. In particular, the backend server can begin processing one or more portions of the audio input data prior to the user having completed making the instructions. Thus, the backend server can start analyzing whatever portion of the audio input data it received through a variety of techniques such as automatic speech recognition (ASR) and natural language understanding (NLU) to convert the audio input data into a series of identifiable words, and then to analyze those words in order to interpret the meaning of the request from the user. The backend server can utilize ASR techniques to recognize the spoken words that were recorded and stored in the MP3 data and to translate them into known text that can then be analyzed by NLU techniques to attempt to decipher the meaning of the request from user. Any suitable computer implemented speech-to-text technique may be used to convert the received audio signal(s) into text, such as SOFT-SOUND speech processing technologies available from the Autonomy Corporation, which is headquartered in Cambridge, England, United Kingdom. In some embodiments, one or more filters may be applied to the received audio input data to reduce or minimize extraneous noise, however this is not required. In this example, analyzing the audio input data of the request 108 can include determining a product "ACME soap" and an intended action "Add to cart." The backend server can then identify the product from the electronic catalog and add it to the electronic cart associated with the user account. In some embodiments, the device 106 may provide a confirmation such as "ACME soap added to cart."

In the ideal scenario, the system can confidently determine what action to take based on the user's voice command. However, there are many sources of errors that can cause the system to not be able to confidently determine what action to take. For example, the user's utterance may not be properly interpreted through automatic speech recognition (ASR) and natural language understanding (NLU). Errors may also occur when attempting to form a product search query from the user's utterance. For example, there may be more than one possible query that is formed from the utterance and the system cannot determine with high enough confidence which query to submit. On the other hand, it may not be possible to form any query from the utterance, which would also create an error. Another source of error may be that a search query returns more than one search result and the system cannot determine with high enough confidence which product the user actually wants. All of these errors may cause the system to be unable to determine with high enough confidence what action to take next. For example, for an ASR error, the system may be unable to determine what words to use to attempt to form queries. In the case where there are multiple possible queries that can be formed, the system may not know which query to use. In the case where more than one product is responsive to a query, the system may not know which product to add to cart. There may be other and different types of error sources than these examples.

Moreover, even when the action is effectively determined, certain follow on actions may be desirable. For example, the user may wish to confirm that the action has occurred, may want to review their shopping cart, and may want to confirm check out. However, several of these actions may be performed by looking at a display of the user device 106, which is undesirable while the user 102 is operating the vehicle 104. Various embodiments of the present disclosure are directed toward systems and methods for receiving a request from a user, determining the user is performing an action that may limit the user's ability to interact with the user device, determine a follow up action for the request, and then provide a response to the user, which may include an immediate response or a delayed response associated with the user's ability to interact with the user device.

E-commerce technology is provided as an example application of the present techniques. However, the techniques described herein can be used to improve various other technologies such as for example, answering questions, playing music, reading audiobooks, controlling connected devices via voice commands/instructions, sending an electronic message, initiating a phone call, among other such technologies where a user's present ability to interact with the user device may be compromised.

Figure 2A:
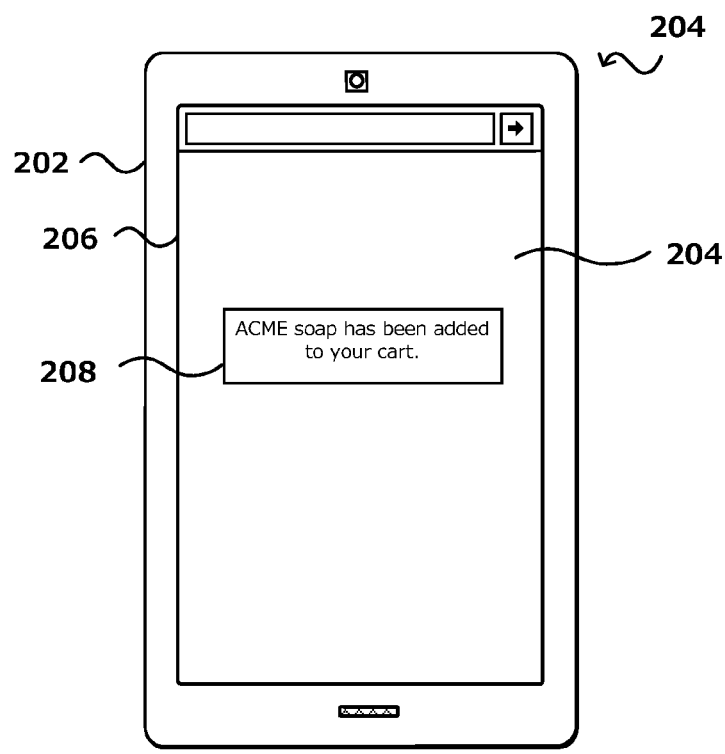
FIGS. 2A-2E illustrate example scenarios in which a user is provided with follow up actions responsive to a request, in accordance with example embodiments.

FIG. 2A illustrates an example environment 200 where a client device 202 is utilized for interactions with a user. For example, a user may provide an utterance, which may include a request, such as a voice request, to the client device 202, as illustrated in FIG. 1. In various embodiments, and as will be described herein, the client device 202 may determine, for example via one or more sensors, that the user is currently performing an action that may limit the user's ability to interact with the client device 202, such as driving a vehicle. Responsive to that determination, a simplified layout 204 may be provided on a display 206. In certain embodiments, the determination may be made prior to the user providing the utterance. For example, the user may provide permission for a software program, executing on the device, to access one or more sensors. Information from the one or more sensors may be utilized to determine the user's activity, and responsive to determining the activity is one where the user's attention may be limited, a simplified display mode (e.g., car mode, busy mode, active mode, etc.) may be initiated. In the illustrated embodiment, the simplified layout 204 provides a communication to the user. Communications may refer to in-app or in-program communications that are associated with specific software programs executing on the device. Additionally, communications may also refer to global communications executing on the operating system of the device. In various embodiments, communications may further be referred to as notifications and prompts. The notification may provide a message to inform the user that an action has occurred. In contrast, a prompt may provide a message to inform the user that a further action is requested. In other words, a notification may provide information while a prompt may request an action. In this embodiment, the communication is in the form of a notification 208 to the user that the action has been completed. As shown, there is no option provided for the user to interact with the display 206, and there is no request for further action, however, in other embodiments that may be one or more selectable icons for the user to interact with. In various embodiments, the indication 208 may also be accompanied by an audio indication, a tactile indication, or additional visual indications. For example, the client device 202 may make a sound or provide a confirmation. Additionally, or in the alternative, the client device 202 may vibrate. Moreover, in various embodiments, the client device 202 may flash or modify a color of the display 206. By way of example only, the client device 202 may flash a specific color indicative of a notification (such as green for confirmation) and a different color indicative of a prompt (such as yellow for a request). As a result, the user may be provided with information regarding their request, however, this information may be provided in a passive form such that the user is not tempted to interact with the display 206 during their activity.

Figure 2B:
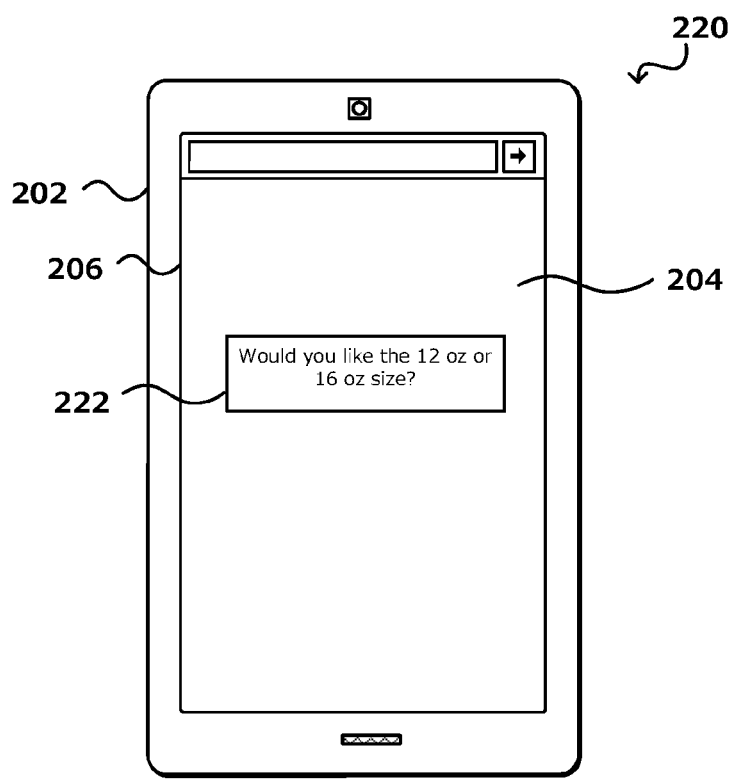

As noted above, in various embodiments one or more follow on actions may be available in response to the user's request. In this example, ACME soap may come in a variety of different sizes or scents. Moreover, the user may be prompted to review a shopping cart and complete a checkout process. FIG. 2B illustrates an example environment 220 of the user device 202 where the user is provided with a follow on action communication, which is illustrated as a prompt 222. In various embodiments, this is an app-level prompt that is provided specifically through an application executing on the device, in response to the user's utterance. However, as noted above, prompts may also be provided at a system level. As shown, the simplified layout 204 is still present on the screen, indicating that the user is still currently performing an action or task that may hinder the user's ability to interact with the device 202. In this embodiment, the follow on action prompt 222 provides a question to the user regarding the request for ACME soap. It should be appreciated that the follow on action prompt 222 may be illustrated as a visual notification, but in other embodiments the notification may also include or in the alternative include an audio notification, a tactile notification, or the like. For example, the follow on prompt 222 may also be accompanied by an audio notification that repeats the illustrated wording. For example, the audio notification may be routed through the speakers for an automobile that the user is currently operating.

As will be described below, in various embodiments the system may make a determination whether to provide the follow on prompt 222 or whether to wait until the user has completed their current activity. For example, because the illustrated embodiment has a follow on that may be answered with one word (e.g., "12" or "16"), it may be appropriate to provide the follow on action prompt 222 at this time. However, a more complicated answer, or a series of questions and answers, may be better suited for later presentation. As an example, if the user were asked to select between the quantity, scent, suitability, etc. of the soap, it may be more reasonable to provide the follow on notifications when the user can interact with the device visually.

Figure 2C:
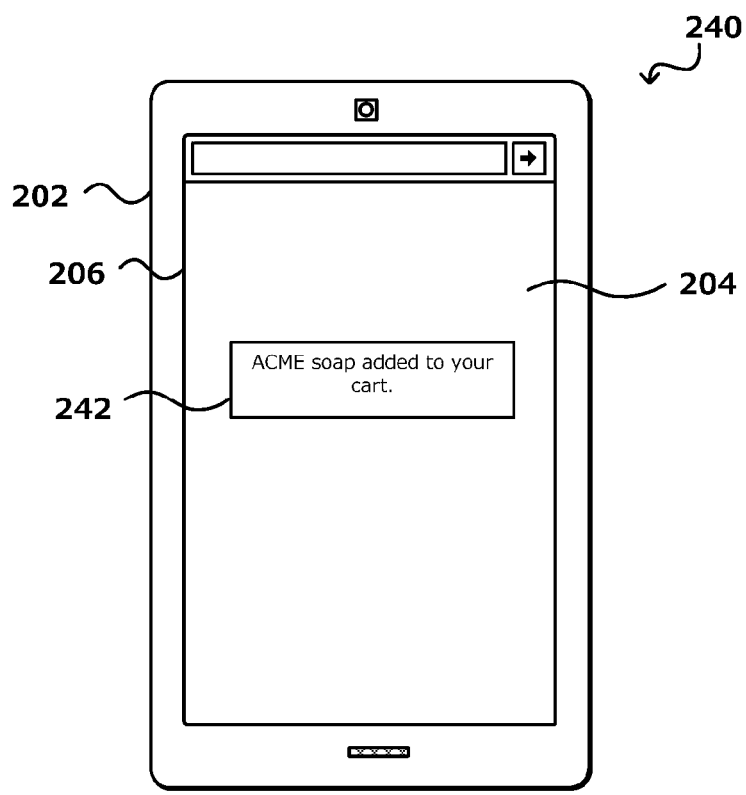

FIG. 2C illustrates an example environment 240 where the client device 202 is providing a confirmation notification 242 to the user, in response to performing a requested action. As illustrated, because the user is still determined to be performing an activity that preferably minimizes interaction with the device 202, the simplified display 204 is still present on the device 202. For example, in this embodiment, the confirmation notification 242 includes a textual message indicating "ACME soap added to your cart." For example, this confirmation may be provided after the user provided a response to the query illustrated in FIG. 2B. However, it should be appreciated that additional notifications, such as auditory or tactile notifications, may also be provided in place of or in addition to the confirmation notification 242. As a result, the user is confident that the request has been performed, and as a result, can maintain focus on the current activity without interacting with the device. However, as noted above, in various embodiments completion of the user request may utilize additional steps or interactions from the user, this intermediate confirmation may reduce the likelihood that the user interacts with the device to confirm the action has completed.

Figure 2D:
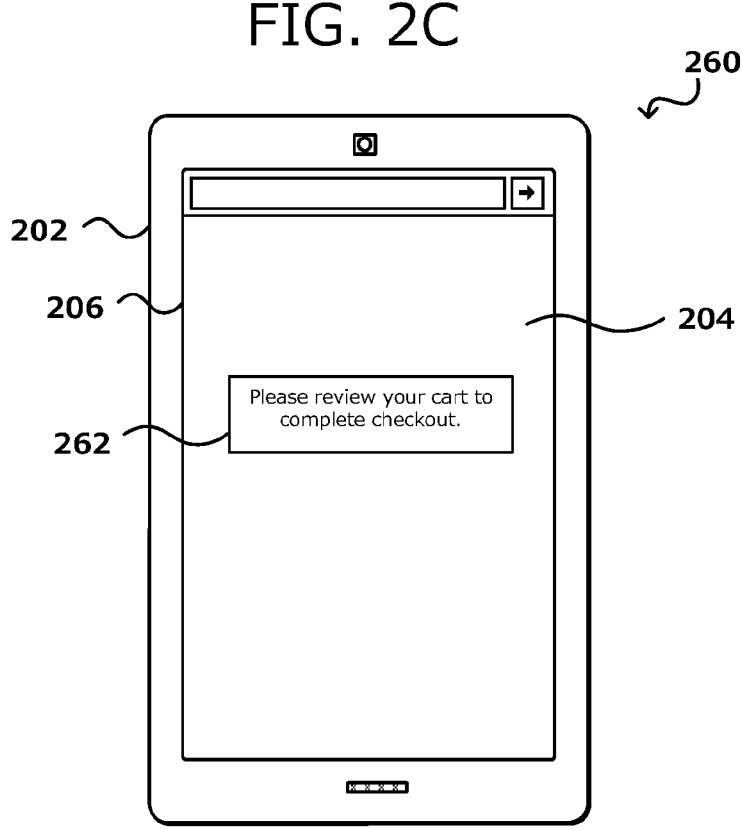

FIG. 2D illustrates an example environment 260 where the client device 202 has determined that the user has completed their previous activity. The illustrated embodiment maintains the previously described simplified display 204, however, it should be appreciated that the display may be switched to a normal display for the client device 202. The display 204 includes a review prompt 262 directing the user to review their cart to complete their transaction. For example, upon selecting the review prompt 262, the user may be redirected to their shopping cart where orders may be reviewed, modified, and purchased. Additionally, in embodiments, the prompt 262 may be provided while the previous activity is occurring and then, upon completion, the user's cart may be automatically provided to complete the action. As noted above, the option to review the cart may be withheld or otherwise unavailable until after the user has completed their previous activity (e.g., has stopped driving).

Accordingly, the likelihood of the user interacting with the device 202 during the activity is reduced.

Figure 2E:
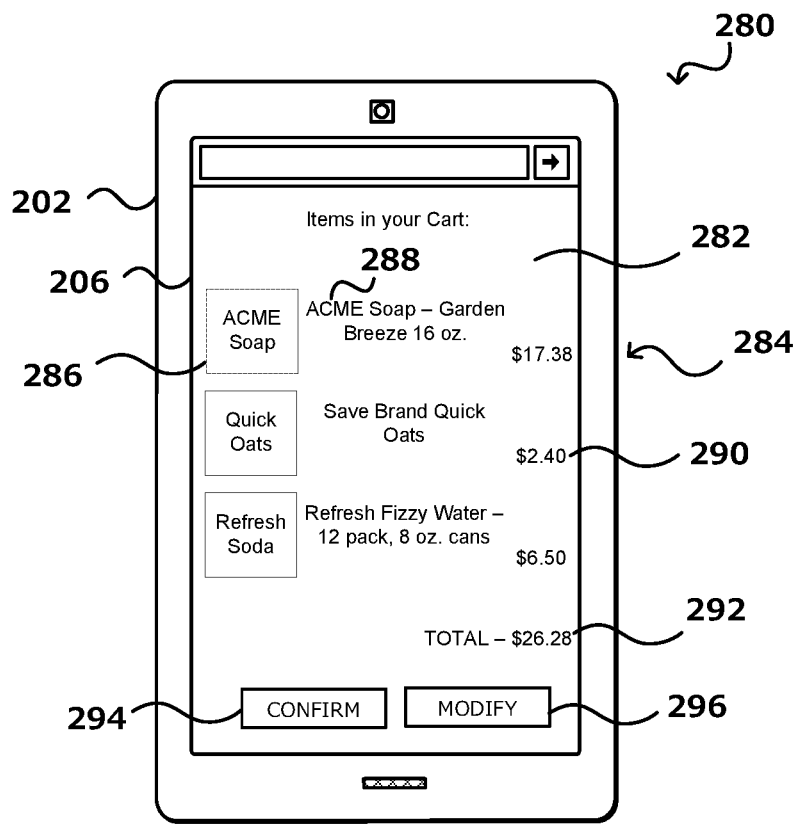

FIG. 2E illustrates an example environment 280 where the client device 202 has determined that the user has elected to proceed to their cart for review and completion of their purchase. The illustrated embodiment has switched from the simplified display 204 to an interactive display 282. The illustrated interactive display 282 includes various interactive features where the user may review items in their cart, complete checkout, and the like. For example, a list 284 includes items within the cart, including images 286, descriptions 288, and prices 290. Additionally, a total 292 is included that represents the sum total of items in the last 284.

Because the display is interactive, interactive icons 294, 296 are included for the user to modify or approve their cart. For example, the interactive icon 294 enables the user to confirm the items in the cart, which may proceed to a payment screen where the user can enter payment information, or use stored payment information associated with an account, select delivery or pickup options, or the like. Additionally, the interactive icon 296 enables the user to modify one or more items in the list 284. For example, if the user would like a different scent than "Garden Breeze" for the ACME soap purchase, the user may select the interactive icon 296 in order to modify the items within the cart. From there, the user may select one or more items for modification and/or removal from the cart. In various embodiments, each individual item within the cart may have an independent interactive icon to confirm or modify each item individually.

Advantageously, the user can add items to the cart while performing various activities and then, at a later time, the user can optionally return to the cart for completion of their purchase. For example, the user's actions can be aggregated during the period of time where the user is performing an action and then, at a later item, a follow on action may be provided that enables multiple requests to be completed. In certain embodiments, the user may elect different communication options (e.g., notifications and/or prompts) to provide reminders for reviewing and completing the cart. For example, the user can select how often reminders are sent, if notifications are sent at all, and the like. As a result, the user can add items to their cart at the moment the user thinks of the items and then, at a later time, may complete their purchases when they are not occupied by other activities.

Figure 3:
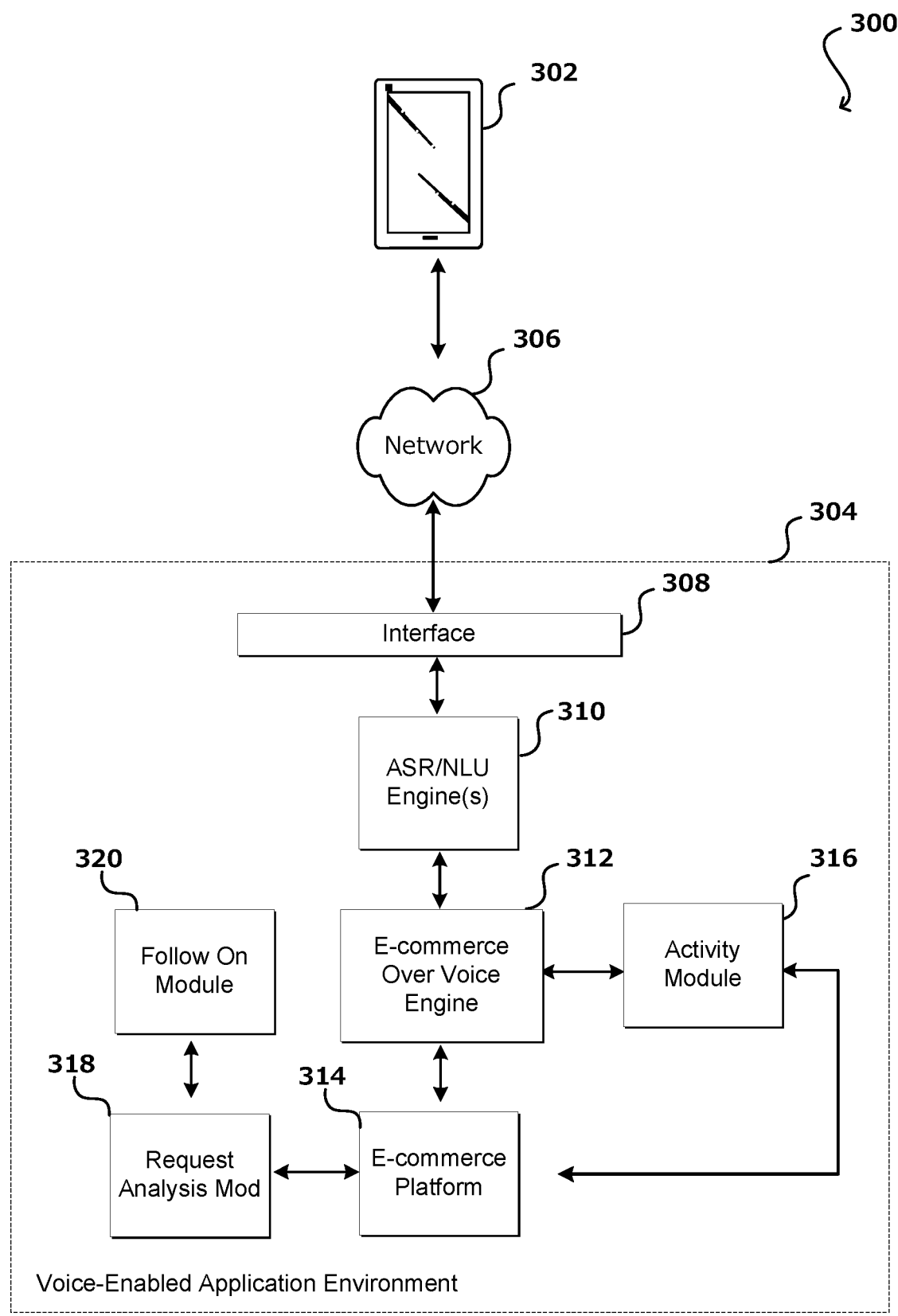
FIG. 3 illustrates a diagrammatical representation of a voice-enabled e-commerce environment with user activity monitoring for follow on actions, in accordance with example embodiments.

FIG. 3 illustrates a diagrammatical representation of a voice-enabled system 300 with a user activity detection, in accordance with example embodiments. A voice-enabled client device 302 captures an utterance spoken by a user, such as a command following a wakeword. The voice-enabled client device may be any type of client device that includes an audio output device such as a speaker and an audio input device such as microphone, and network connectivity. This includes special voice-communication only devices, personal computers, tablet computers, smart phones, notebook computers, and the like.

The voice-enabled client device 302 then sends the audio data representative of the utterance to a server-side voice-enabled application system 304 over a network 306. In this example, an audio signal is received from a voice-enabled client device 302 to initiate a voice-enabled shopping task. The network 306 can include any appropriate network, such as the Internet, a local area network (LAN), a cellular network, an Ethernet, Wi-Fi, Bluetooth, radiofrequency, or other such wired and/or wireless network. The voice-enabled application system 304 can include any appropriate resources for performing the various functions described herein, and may include various servers, data stores, and other such components known or used for providing content from across a network (or from the cloud).

The audio data from the voice-enabled client device 302 is received through an interface 308, which facilitates communications between the voice-enabled client device 302 and the voice-enabled application system 304. For example, the interface 308 may process data received over the network 306 for use by other components of the server-side voice-enabled application system 304. For example, in some embodiments, the interface 308 may perform some signal processing on the received audio data such as noise reduction, filtering, and the like. The interface 308 may also prepare data to be transmitted over the network to the voice-enabled client device. An automatic speech recognition (ASR) and natural language understanding (NLU) engine 310 can receive and interpret the audio data. In this example, the audio data, or a processed version of the audio data undergoes a variety of techniques such as to convert the audio input data into a series of identifiable words, and then to analyze those words in order to interpret the meaning of the request from the user. The backend server can utilize ASR techniques to recognize the spoken words that were recorded and stored in the audio data and to translate them into known text that can then be analyzed by NLU techniques to attempt to decipher the meaning of the request from user. In some embodiments, the ASR/NLU engine 310 can be used to determine that the user utterance in the audio data includes an e-commerce request, and is thus an e-commerce over voice engine 312, for example, is invoked to handle the request.

The e-commerce over voice engine 312 may perform a plurality of processing steps in an attempt to fulfill the voice request. The plurality of processing steps may include analysis of the utterance text using a language-understanding framework associated with the type of request. The plurality of processing steps may include generating and selecting a search query from the utterance text. The plurality of processing steps may include conducting a search of database of items using a search query. The plurality of processing steps may include additional or different steps, depending on the type of the request. The e-commerce over voice engine 312 may access the e-commerce platform 314 to obtain data, such as a product catalog and other information, for performing such steps. In some embodiments, the e-commerce over voice engine 312 may also access user account information, such as demographic information, previous purchases, a user-specific speech recognition key, among other information that may contribute the processing steps. For example, the user-specific speech recognition key may contribute to the ASR process. The purchase history may contribute to disambiguating between multiple search results.

As noted above, embodiments of the present disclosure are discussed with reference to e-commerce, but it should be appreciated that, in other embodiments, different applications may also utilize the systems and methods described herein. For example, a user may make a variety of different requests to a voice assistant executing on a user device. These requests may have a variety of different follow on actions, where some are more suitable to address at different times. For example, if a user were operating a vehicle and requested, through a voice assistant, to make a reservation at a particular restaurant, the voice assistant may need several additional pieces of information to complete the request, such as asking how many people for the reservation, what time, which restaurant, and the like. The information may be better to address when a user's current activity enables interaction with the voice assistant.

As noted above, it may be desirable to determine a user's present activity, such as whether the user is operating a vehicle, which may occur prior to access the e-commerce platform 314. In the illustrated embodiment, an activity module 316 is accessed in response to the determination from the e-commerce over voice engine 312. As will be described below, the activity module 316 may obtain information from one or more sensors, among other options, in order to determine a current activity for a user. The user's current activity may regulate the content presented to the user. For example, the user may receive a simplified interface to discourage interaction for certain activities, such as operating a vehicle. In contrast, the user may receive an interactive interface if the user is sitting on a couch at home.

The e-commerce platform 314 may be associated with a user account, which may include a shopping list or other activities that the user may request interaction with through the device 302. A request analysis module 318 may also be associated with the e-commerce platform 314. For example, the request analysis module 318 may receive product information from the e-commerce platform 314. The product information may facilitate determining whether the request may be addressed at a current time or a later time. For example, the request analysis module 318 may evaluate the request for ACME soap from FIG. 1. The e-commerce platform 314 may access and provide a listing for ACME soap that includes three different scents and two different size options. As a result, the request analysis module 318 may, through a series of rules, determine that the request is above a threshold level of simplicity. Requests that are too complex may then be tracked using a follow on module 320. The follow on module 320 may track requests from the device 302 and, in response to a determination from the request analysis module 318, may perform one or more actions.

Certain follow on actions are performed in real or near-real time (e.g., with no significant delay) in response to the request. For example, a follow on action needing a "yes" or "no" action may be performed after receiving the request. However, a follow on action that has a series of questions or may utilize interaction with a display of the device may be stored and executed later, for example, upon determination that the user has completed their current activity.

Figure 4:
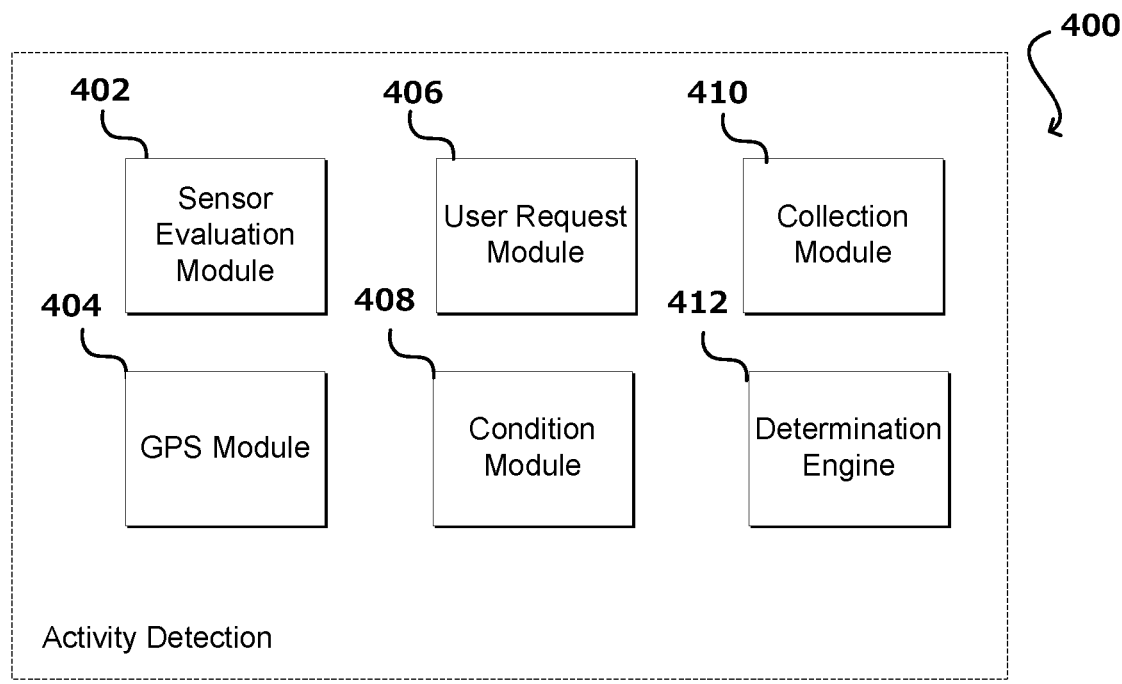
FIG. 4 illustrates a diagrammatical representation of an activity detection system, in accordance with example embodiments.

FIG. 4 is a diagrammatical representation of an activity detection system 400, such as the activity module 316 associated with FIG. 3. It should be appreciated that one or more features may be incorporated within the system described in FIG. 3 and/or may be a separate, independent system. Moreover, access to the information for the systems discussed herein may be provided in response to permissions and/or authorization from the user. The illustrated activity detection system 400 may receive information from one or more sensors, which may be associated with a user device, a vehicle, or the like. For example, a sensor evaluation module 402 may receive information from a variety of different sources. By way of example, the sensor evaluation module 402 may receive vehicle information, such as speed. Additionally, the sensor evaluation module 402 may receive inertial information from the user device. This information may be utilized, at least in part, to evaluate information regarding the user's current activity. For example, a speed above a threshold may be indicative of the user and a motorized vehicle. That is, a user is unlikely to be traveling at 40 miles per hour without the assistance of some external device. Speed may be one indicator with an associated threshold for determining the user's current activity. For example, a speed of approximately 2 miles per hour may be indicative of walking and unlikely to be associated with larger vehicles, like cars. However, as will be noted below, information from more than one sources may be utilized when information from a single source is deemed insufficient for making a determination.

The system further includes a global positioning system (GPS) module 404. The GPS module 404 may communicate with one or more satellites to provide a relative position of the user device on earth. In various embodiments, the GPS module 404 may receive information from the user device and/or the vehicle, for example, where the vehicle is equipped with a separate navigation or GPS system. Movement of the device and/or vehicle may then be tracked. The GPS module 404 may receive the tracking information and utilize such information to determine the user's current activity. For example, a location along a major roadway, such as a highway where pedestrian traffic is not allowed, may be indicative of the user's activity being associated with a vehicle. Moreover, speed may also be determined using the GPS module 404, such as by determining a duration of time for the user to travel between different locations.

Various embodiments may further include a user request module 406 for requesting information, from the user, regarding their current activity. For example, the user request module 406 may transmit a notification to the user device requesting information regarding the current activity. For example, the message may ask "Are you driving?" or "Are you about to start driving?" This message may be an auditory message, a textual message, or a combination thereof.

Additional information regarding the user's activity may be gleaned from current user conditions. For example, upon receiving permission, a condition module 408 may evaluate other connections associated with the user device. The user device being communicatively coupled to a vehicle's BLUETOOTH™ system, for example, may be indicative of the user being in the vehicle. Moreover, connection to a home wireless internet network may be indicative or not being in the vehicle. Additionally, other connections such as business wireless internet systems and the like may also provide information that may be utilized to determine the present activity for the user. Furthermore, applications executing on a user device may provide information. For example, if an application associated with a ride sharing service is open and active, such as one where the user rents a scooter or bike, the user's present activity may be inferred from the application. This information, in combination with other information, or by itself, may be utilized to determine the present condition of the user, which as noted above, may determine the presentation of the display.

A collection module 410 may receive information from the other modules and aggregate the information for evaluation. The collected information may be transmitted to a determination engine 412, which evaluates the information, and determines the user's present activity. As noted above, the present activity may be options between whether or not the user would be distracted by interacting with the user device. In other words, the determination engine determines which display to present to the user. For example, information may be evaluated and, based at least in part on the information, a determination may be made that the user is operating a vehicle. As a result, the simplified display may be presented to the user. In certain embodiments, the user may have the option to change the display. However, providing the simplified option as a default may be preferable to reduce the likelihood of distractions to the user.

The determination engine may evaluate the information in order to determine the user's current activity. For example, information associated with a connection to a vehicle's communication systems as well as sensor information related to fast speeds may be weighted more heavily than other information. Additionally, pairs or sets of information, presented together, may have a higher rating. In this manner, a determination may be made regarding the user's present activity. This determination may be evaluated against a confidence threshold and, if the threshold is exceeded, the system may determine that the user would be distracted by a fully interactive display, and as a result, may switch the display to a simplified display.

In various embodiments, a hierarchical structure may be formed for making the determination. For example, a first data point may be evaluated and, if that data point is indicative of the user's current activity, subsequent data points may not be evaluated. By way of example only, when evaluating whether a user is driving, a first data point may correspond to whether or not the user's device is connected to a vehicle BLUETOOTH™ system. If so, the user's action may be determined to be driving a car. However, additional data points may also include movement or activity detection via sensors associated with the user device. Additionally, data points may correspond to whether the user has manually entered a particular mode on their device. In certain embodiments, information from other applications executing on the device may be analyzed, upon receiving appropriate permissions. For example, a user may have activated a "driving mode" on their text messaging application, which is indicative of the user operating a vehicle.

Figure 5:
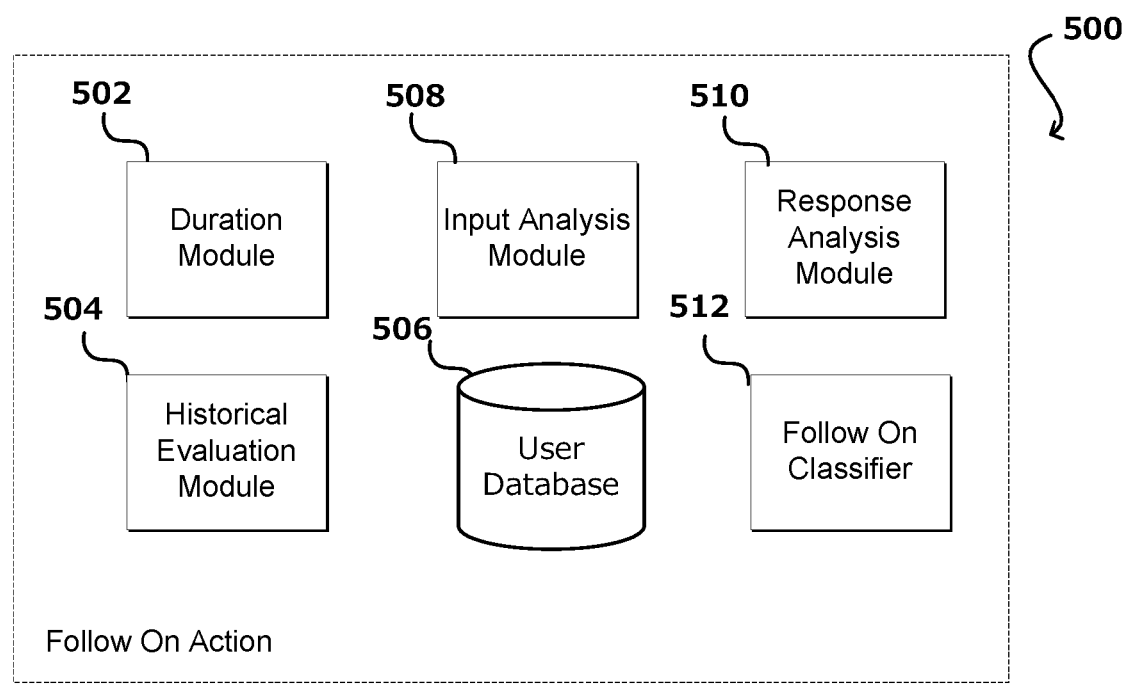
FIG. 5 illustrates a diagrammatical representation of a follow on action determination system, in accordance with example embodiments.

FIG. 5 is a diagrammatical representation of a follow on action system 500, such as the follow on module associated with FIG. 3. It should be appreciated that one or more features may be incorporated within the system described in FIG. 3 and/or may be a separate, independent system. Moreover, access to the information for the systems discussed herein may be provided in response to permissions and/or authorization from the user, as noted above. The illustrated embodiment includes a duration module 502 for evaluating a duration of the request received from the user. For example, the duration module 502 may include a timer that tracks a length of a request from the user. In various embodiments, a longer request may be correlated to more information and/or complicated instructions. In response to determining that the request contains complicated instructions, it may be advantageous to delay follow on actions until the user has completed their current activity. As noted above, information from the duration module 502 may be evaluated in addition to other information, where different information is weighted to determine a confidence regarding how to proceed with follow on actions. Accordingly, it should be appreciated that the duration of the request may be utilized as one component of the analysis.

A historical evaluation module 504 receives data from a user database 506, including how the current user, or an aggregated set of users, have performed follow on actions in the past. For example, information may be anonymized and aggregated from a variety of users of an application, such as an e-commerce marketplace, to determine follow on actions for different categories or types of requests. This information may then be utilized to inform the system how to handle follow on actions for current requests of the user. For example, if past users have interacted with their devices heavily following a particular request, and a current request from the user is the same or similar, it is likely that the user will also interact heavily with the device. As a result, it may be helpful, to the user, to delay the follow on actions until the user's current activity has completed. Additionally, if the user or other users have quickly handled follow on actions, the follow on actions may be provided in response to receiving the request.

An input analysis module 508 may be utilized to determine the context or different aspects of the received request. In various embodiments, a user utterance may be received, converted into text, and then distributed to one or more domains (for example at a distributed computing environment) for analysis. By way of example only, a user utterance may correspond to "Add ACME soap to my cart." This utterance may be converted to text that can be analyzed by one or more systems for text analysis. These systems may then determine if particular words within the utterance correspond to different domains for execution of the request. In this example, "cart" may be indicative of a shopping application, and as a result, the text may be transmitted to a domain associated with shopping. Then, the remaining converted text may be compared against a data store of words associated with products that are available. For example, ACME may be a recognized brand and known ACME products may also be identifiable within the selected domain. Each of these steps may be conducted at a server that is remote from the user device where the data may be processed and then transmitted back to the user device.

In an example, the input analysis module 508 may determine how many words are spoken or analyze a quantity of information presented with the text. Additionally, the input analysis module 508 may evaluate whether multiple requests or instructions were included within the request. For example, a request such as "Add soap to my shopping cart and set it for pick up at Corner Store at 3 pm" may be deemed a complicated request due to its nature. For example, first the request involves "soap" but does not specify a specific brand, type, scent, quantity, or the like. Additionally, there is no address or location provided for Corner Store, which if a chain, there may be several near the user. Furthermore, there is no date. While it may be inferred the user wants pick up that same day, from the context, there are still multiple levels to this request. As a result, the input analysis module 508 may return that the multiple requests, coupled with several areas of classification, may be deemed too complex to address follow on actions while the user is occupied with another activity.

Further, a response analysis module 510 may evaluate how many follow up questions or prompts may follow the request. Returning to the example above, the request for "soap" may yield several additional prompts in order to identify the desired product. The response analysis module 510 my specify a threshold number of follow up prompts as being too complex. Additionally, the level of detail for the follow up requests may also be evaluated. For example, if "soap" is offered in variety of different configurations and sizes, that may be deemed complex for the present user activity.

A follow on classifier 512 evaluates information from the remaining modules to determine how to proceed with the follow on actions. For example, the follow on actions may apply a weighting to determinations from the other modules and develop a confidence factor for determining whether to present information to the user in response to the request or whether to wait until the user has completed their current activity. In certain embodiments, the follow on classifier may modify the decision, such as when a follow on action is requested and then the complexity increases. For example, in response to the soap example above, if the user was asked "What brand?" and the user replied with "What brands are available?" then the system may determine that it may be better suited to provide a visual indication of the available brands, for example, where the number of brands exceeds a threshold number. Accordingly, responsive to the question, the virtual assistant may respond with a notification that continued interaction will wait until a later time.

In various embodiments, the determination of the follow on classifier 512 determines the response transmitted to the user device following the request. For example, if the follow on classifier 512 deems the follow on actions as being above a threshold level of complexity, then the response will correspond to a notification or indication that the user's request has been received and that it has been added to a list or queue where follow on actions will be reviewed and/or completed prior to execution of the request. However, if the follow on classifier 512 is below the threshold complexity such that completion may be occurred with limited and/or an acceptable amount of continued interaction, the follow on classifier 512 may instruct further questions and/or inquiries to the user to clarify and complete the request. In this manner, the user's attention may be maintained on the current activity while still providing the convenience of utilizing the virtual assistant.

Figure 6:
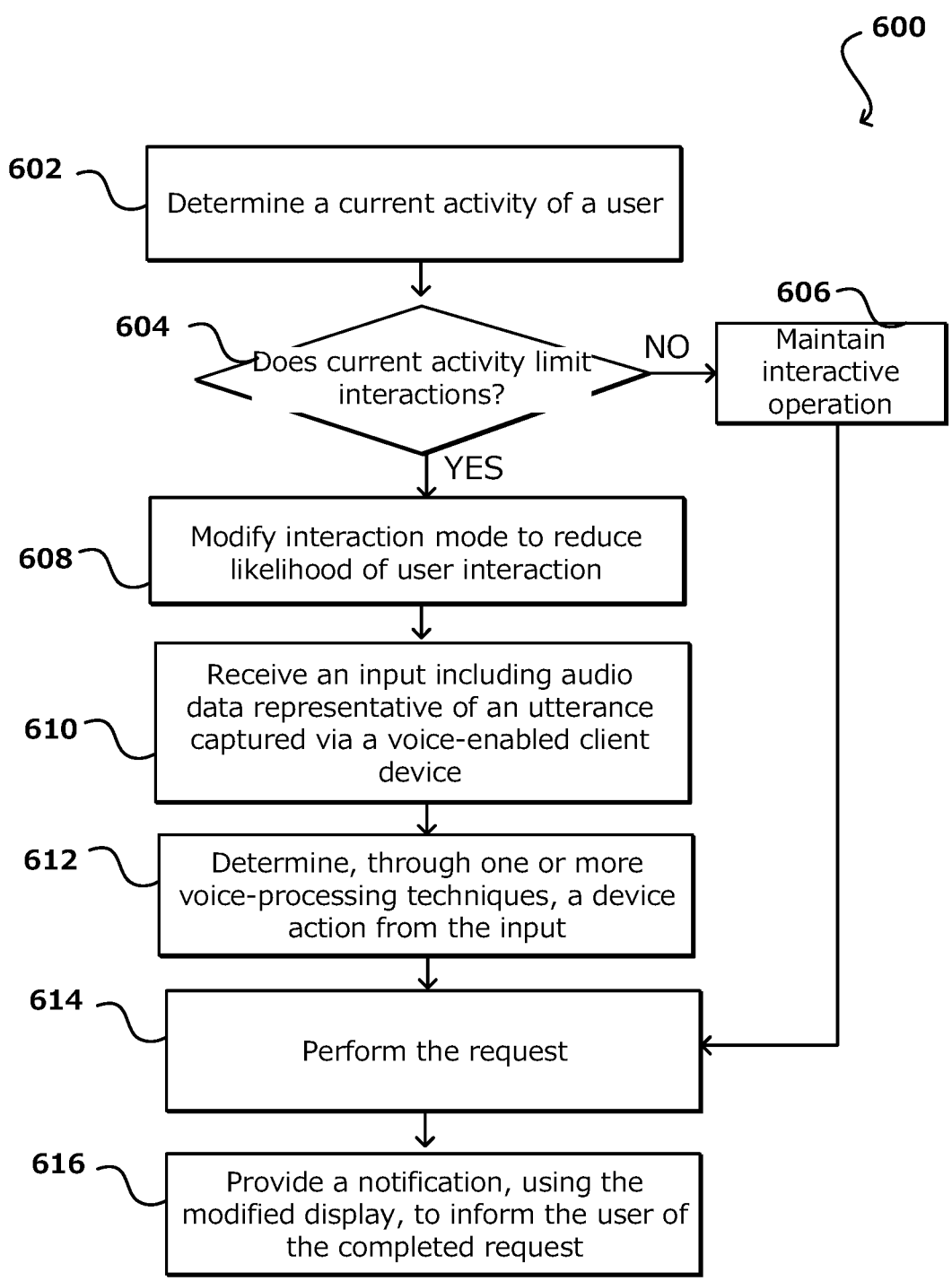
FIG. 6 illustrates an example process of providing notifications to a user responsive to a request, in accordance with various embodiments.

FIG. 6 illustrates an example process 600 of activating an operating mode for a user device based on a user's activity, in accordance with various embodiments. It should be understood that, for any process discussed herein, there can be additional, fewer, or alternative steps performed in similar or alternative orders, or in parallel, within the scope of the various embodiments. It should further be appreciated that one or more steps of this method may be performed in response to receiving permission from a user for access to one or more sensors or processes associated with a user device. For example, a user may provide an affirmation that a computer program, executing on their device, has permission to receive data from one or more sensors associated with the device. Certain functionality of the program may be disabled or unavailable if the user does not provide the permissions.

In this example, a current activity of the user is determined 602. For example, users often interact with devices using voice controls while performing other tasks, such as operating a vehicle or performing household chores. The convenience associated with a voice assistant enables such interactions without substantially drawing attention away from the activity. However, certain activities or applications associated with a user device may be preferably performed with reduced or limited distractions and/or secondary interactions, such as operating a vehicle, performing exercise, performing chores, or the like. Embodiments of the present disclosure are directed toward reducing user interactions with their device when the user is performing an activity where reduced interactions are desirable. As noted above, the user's current activity may be determined in a variety of ways and may include multiple different data points in order to determine the activity with a threshold level of confidence. For example, one or more sensors of the user device, or an associated device, may be evaluated to determine the user's current activity. By way of example, if a user were driving a car the one or more sensors may determine that the user is traveling at a speed that is greater than a speed a human can travel without mechanical assistance. Additionally, associated connections may be evaluated, such as connections to a vehicle infotainment system or connections to home wireless network. Furthermore, the user may voluntarily provide the information, such as by setting a "driving mode" or "limited interaction mode" on their user device to indicate the user is operating a vehicle or wishes to have interactions limited.

The determined current activity is evaluated to determine whether or not it is desirable to limit interactions during the activity 604. In various embodiments, a list or group of activities may be selected and designated as interaction-limiting activities, such as operating a vehicle, exercising, performing chores, etc. In other embodiments, the determination may be based on how complex follow on actions for the request are, as noted above. Additionally, as noted, the user may also manually inform the device that any action they are currently undertaking is interaction limiting, even in the absence of additional information from the one or more sensors. If the activity is not interaction limiting, then an interactive operational mode, which may include an interactive display, is maintained, for example, via a user device 606. For example, the interactive operational mode may be a normal operating mode that enables the user to interact with the device and provides information to the user in a manner consistent with the user's display and operational settings.

However, if the activity is interaction limiting, then a modified interaction mode may be presented 608. As noted herein, the modified interaction mode may include a simplified display that restricts user inactions. For example, a modified display may exclude interactive elements, such as buttons, and may provide limited information via textual or audio displays. In various embodiments, the modified display may provide information in a manner to reduce distractions, such as providing information that limits the user's attention on the screen to a predetermined period of time. The modified display may also be part of a larger operational mode associated with interaction limiting activities. The modified interaction mode may also provide different interactions with the user. For example, if the user device is operating a voice-enable digital assistant, the digital assistant may be more verbose or provide additional detail to the user in an attempt to prevent or reduce the likelihood that the user looks at the display. In other words, additional information may be provided via audio than by visual displays. Furthermore, the type of information provided may be different in the modified interaction mode. For example, certain features may be disabled or certain applications may be blocked, such as video games. However, it should be appreciated that the user may be provided the option to "opt out" or exit the modified display or the operational mode at any time.

In this example, audio data representing a user utterance, corresponding to a user input, is received 610. The audio data is captured by the voice-enabled device and may be associated with a user account for a software program executing on the device. For example, the user account may be that of an e-commerce platform that has a database of products available and the software program may enable the user to buy products. The user audio data may be processed through an automatic speech recognition process to determine device actions associated with the request 612. In some embodiments, the automatic speech recognition process may utilize an automatic speech recognition (ASR) model, a natural language understanding (NLU) model, a contextual understanding model, and/or a named entity recognition (NER) model associated with an e-commerce platform. The audio data is used to determine if there are any follow on actions associate with the utterance, such as a request for an action. In an example, the user utterance includes an e-commerce request, in certain embodiments, wherein the e-commerce request includes an item. In other cases, the audio data may include a different type of request, such as an informational request, a smart device control request, and the like.

In embodiments where the input includes a request, the request is performed by the client device 614. For example, if the user requested an item be added to an online shopping list, the client device, which may be executing one or more applications associated with the online shopping list, may add the item to the list. In certain embodiments, additional information may be useful for adding a desired item, as described above, and as a result the item may be added, but the purchase may not be completed without performing one or more follow on actions. Additionally, in various embodiments, the item may not be added, but the request may be flagged for later completion. The client device may then provide a notification indicating that the request has been completed 616. For example, using the modified, simplified display, the client device may display a textual notification that the action is complete and/or my play an audio notification of completing the task, among other such options. In this manner, the user's request may be completed while also reducing user interaction with the client device due to the user's current activity.

Figure 7:
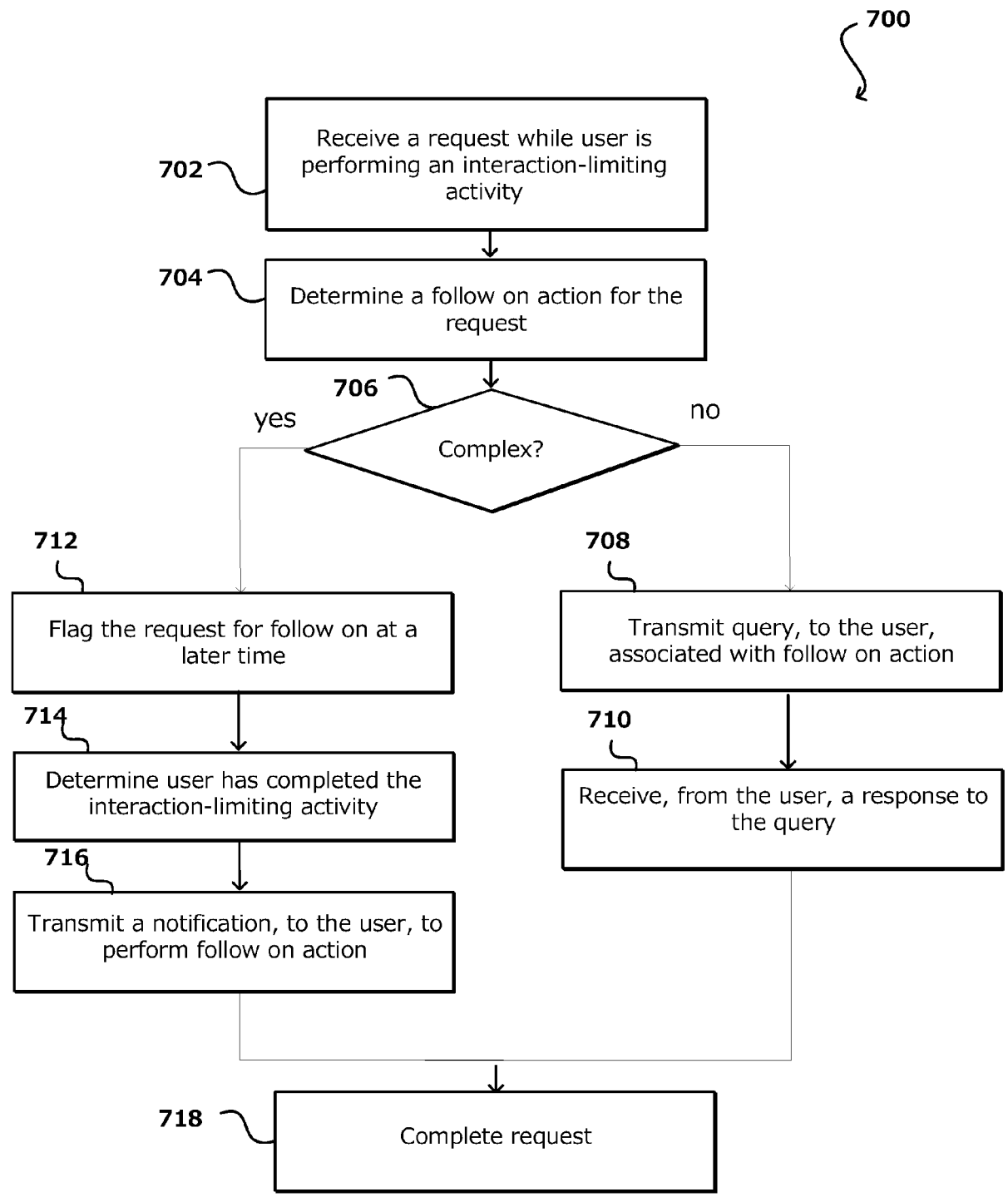
FIG. 7 illustrates another example process of determining timing for a follow on action, in accordance with various embodiments.

FIG. 7 illustrates an example process 700 of handling a voice command with a follow on action. In this example, a request is received, for example an utterance, while the user is performing an interaction-limiting activity 702. For example, in various embodiments an interaction-limiting activity may refer to an activity where a user's attention is preferably focused on the activity, such as operating a vehicle. The request is received and processed, as noted above, and a follow on action is determined 704. For example, the follow on action may be a request for clarification regarding a quantity of items. Additionally, the follow on action may be a reviewing and completing a purchase, in embodiments directed toward e-commerce applications.

Different requests may have different follow on actions and each of these follow on actions may have a different level of complexity. For example, a follow on action to specify a quantity for purchase may be deemed a simple or non-complex follow on action because the user can clarify the request with a single word. However, reviewing a display including a number of items are answering a series of questions may be deemed a complex follow on action (or series of actions) that are preferentially not performed during the interaction-limiting activity. The complexity of the request is determined 706 in this example, such as by evaluating the initial request, evaluating the magnitude of the follow on action, evaluating historical information for the user or other users making similar requests, or the like. In various embodiments, there may be a set of rules for evaluating and determining complexity. If the request is not complex, a query may be transmitted back to the user 708. The query may be a question, such as requesting the user provide additional information. The user may respond to the query 710 to satisfy the follow on action.

In certain embodiments, the follow on action is deemed as too complex for the interaction-limiting activity and the request is flagged for action at a later time 712. For example, the user may receive a notification that the request is processing or is in a queue for additional actions at a later time. In other words, the status of the follow on action is tracked or otherwise followed until such time as the user performs an action to satisfy the follow on action. The user's activity is monitored for completion of the interaction limiting activity 714. Once complete, a notification may be transmitted to prompt the user to complete the follow on action 716. Upon completing the follow on action, the request is completed 718.

It should be appreciated that a request may have multiple levels of follow on actions, where different portions of the action may be completed at different times. For example, if a user requests for an item to be added to a shopping cart, there may be two levels of follow on actions. First, a follow on action to specify a quantity, brand, or aspect of the item may be determined. Second, a follow on action to review and complete a purchase may be determined. The first follow on action may be performed during the interaction-limiting activity, such as by providing a voice prompt to the user and waiting for a response. However, the second follow on action may be deemed complex and may be flagged and delayed until after completion of the interaction-limiting activity. Accordingly, embodiments of the present disclosure may include an interactive or collective process where different segments of an activity are performed, based on individual complexity of the individual follow on actions. Moreover, in embodiments, all follow on actions may be delayed if a single follow on action in a group of follow on actions is determined to be complex. For example, in the example above, the presence of a complex follow on action may delay action on the first follow on action.

Figure 8:
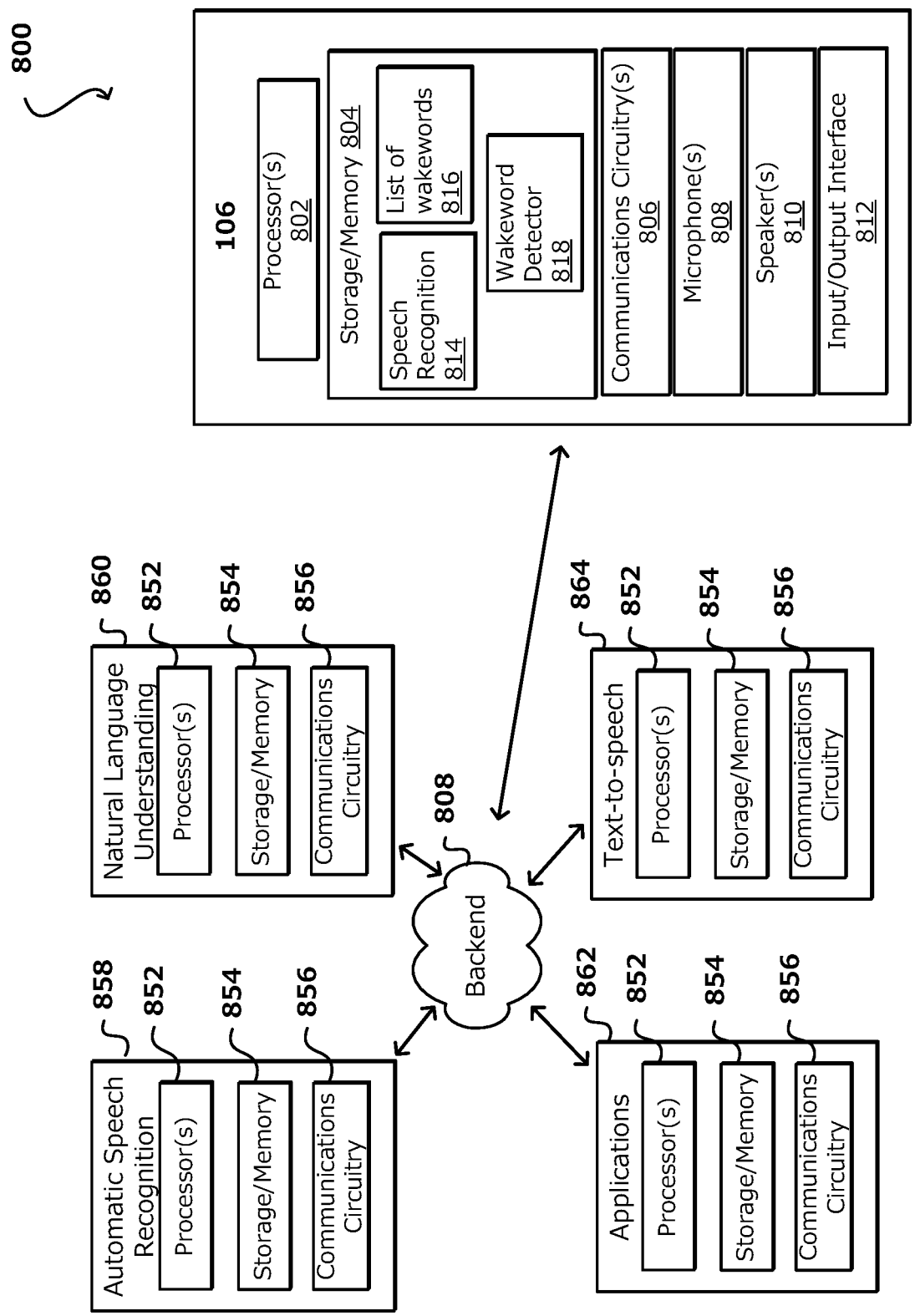
FIG. 8 illustrates an example implementation device, in accordance with various embodiments of the present disclosure.

FIG. 8 is another example environment 800 for implementing aspects in accordance with various embodiments. In this example, voice-enabled communications device 106, in some embodiments, may correspond to any type of electronic device capable of being activated in response to detecting a specific sound. Voice-enabled communications device 106 may, in some embodiments, after detecting the specific sound (e.g., a wakeword), recognize commands (e.g., audio commands, inputs) within captured audio, and may perform one or more actions in response to the received commands. Various types of electronic devices may include, but are not limited to, notebook computers, ultrabooks, tablet computers, mobile phones, smart phones, personal data assistants, video gaming consoles, televisions, set top boxes, smart televisions, portable media players, and wearable computers (e.g., smart watches, smart glasses, bracelets, etc.), display screens, displayless devices (e.g., Amazon Echo), other types of display-enabled devices, smart furniture, smart household devices, smart vehicles, smart transportation devices, and/or smart accessories, among others. In some embodiments, voice-enabled communications device 106 may be relatively simple or basic in structure such that no mechanical input option(s) (e.g., keyboard, mouse, trackpad) or touch input(s) (e.g., touchscreen, buttons) may be provided. For example, voice-enabled communications device 106 may be capable of receiving and outputting audio, and may include power, processing capabilities, storage/memory capabilities, and communication capabilities. Voice-enabled communications device 106 may include a minimal number of input mechanisms, such as a power on/off switch, however primary functionality, in one embodiment, of voice-enabled communications device 106 may solely be through audio input and audio output. For example, voice-enabled communications device 106 may listen for a wakeword by continually monitoring local audio. In response to the wakeword being detected, voice-enabled communications device 106 may establish a connection with backend server, send audio input data to backend server, and await/receive a response from backend server. In some embodiments, however, non-voice-enabled devices may also communicate with backend server (e.g., push-to-talk devices). Voice-enabled communications device 106 may include one or more processors 802, storage/memory 804, communications circuitry 806, one or more microphones 808 or other audio input devices (e.g., transducers), one or more speakers 810 or other audio output devices, as well as an optional visual input/output ("I/O") interface 812. However, one or more additional components may be included within voice-enabled communications device 106, and/or one or more components may be omitted. For example, voice-enabled communications device 106 may include a power supply or a bus connector. As another example, voice-enabled communications device 106 may not include a visual I/O interface. Furthermore, while multiple instances of one or more components may be included within voice-enabled communications device 106, for simplicity only one of each component has been shown. Processor(s) 802 may include any suitable processing circuitry capable of controlling operations and functionality of voice-enabled communications device 106, as well as facilitating communications between various components within voice-enabled communications device 106. In some embodiments, processor(s) 802 may include a central processing unit ("CPU"), a graphic processing unit ("GPU"), one or more microprocessors, a digital signal processor, or any other type of processor, or any combination thereof. In some embodiments, the functionality of processor(s) 802 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 802 may include its own local memory, which may store program modules, program data, and/or one or more operating systems. However, processor(s) 802 may run an operating system ("OS") for voice-enabled communications device 106, and/or one or more firmware applications, media applications, and/or applications resident thereon. Storage/memory 804 may include one or more types of storage mediums such as any volatile or non-volatile memory, or any removable or non-removable memory implemented in any suitable manner to store data on voice-enabled communications device 106. For example, information may be stored using computer-readable instructions, data structures, and/or program modules. Various types of storage/memory may include, but are not limited to, hard drives, solid state drives, flash memory, permanent memory (e.g., ROM), electronically erasable programmable read-only memory ("EEPROM"), CD ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 804 may be implemented as computer-readable storage media ("CRSM"), which may be any available physical media accessible by processor(s) 802 to execute one or more instructions stored within storage/memory 804. In some embodiments, one or more applications (e.g., gaming, music, video, calendars, lists, etc.) may be run by processor(s) 802, and may be stored in memory 804. In some embodiments, storage/memory 804 may include one or more modules and/or databases, such as speech recognition module 803, list of wakewords database 816, and wakeword detection module 818. Speech recognition module 814 may, for example, include an automatic speech recognition ("ASR") component that recognizes human speech in detected audio. Speech recognition module 814 may also include a natural language understanding ("NLU") component that determines user intent based on the detected audio. Also included within speech recognition module 814 may be a text-to-speech ("TTS") component capable of converting text to speech to be outputted by speaker(s) 810, and/or a speech-to-text ("STT") component capable of converting received audio signals into text to be sent to backend server 808 for processing. List of wakewords database 816 may be a database stored locally on voice-enabled communications device 106 that includes a list of a current wakeword for voice-enabled communications device 106, as well as one or more previously used, or alternative, wakewords for voice-enabled communications device. In some embodiments, user may set or program a wakeword for voice-enabled communications device 106. The wakeword may be programmed directly on voice-enabled communications device 106, or a wakeword or words may be set by the individual via a backend server application (app) that is in communication with backend server 808. For example, a user may use their mobile device having the backend server application running thereon to set the wakeword. The specific wakeword may then be communicated from the mobile device to backend server 808, which in turn may send/notify voice-enabled communications device 106 of the individual's selection for the wakeword. The selected activation may then be stored in list of wakewords database 816 of storage/memory 804. Wakeword detection module 818 may include an expression detector that analyzes an audio signal produced by microphone(s) 808 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by microphone(s) 808. Rather than producing a transcription of words of the speech, a keyword spotter generates a true/false output (e.g., a logical 1/0) to indicate whether or not the predefined word or expression was represented in the audio signal. In some embodiments, an expression detector may be configured to analyze the audio signal to produce a score indicating a likelihood that the wakeword is represented within the audio signal detected by microphone(s) 808. The expression detector may then compare that score to a threshold to determine whether the wakeword will be declared as having been spoken. In some embodiments, a keyword spotter may be use simplified ASR techniques. For example, an expression detector may use a Hidden Markov Model ("HMM") recognizer that performs acoustic modeling of the audio signal and compares the HMM model of the audio signal to one or more reference HMM models that have been created by training for specific trigger expressions. An HMM model represents a word as a series of states. Generally a portion of an audio signal is analyzed by comparing its HMM model to an HMM model of the trigger expression, yielding a feature score that represents the similarity of the audio signal model to the trigger expression model. In practice, an HMM recognizer may produce multiple feature scores, corresponding to different features of the HMM models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, voice-enabled communications device 106 may then begin sending the audio signal to backend server 808 for detecting and responds to subsequent utterances made by a user. Communications circuitry 806 may include any circuitry allowing or enabling voice-enabled communications device 106 to communicate with one or more devices, servers, and/or systems. For example, communications circuitry 806 may facilitate communications between voice-enabled communications device 106 and backend server 808. Communications circuitry 806 may use any communications protocol, such as any of the previously mentioned exemplary communications protocols. In some embodiments, voice-enabled communications device 106 may include an antenna to facilitate wireless communications with a network using various wireless technologies (e.g., Wi-Fi, Bluetooth, radio-frequency, etc.). In yet another embodiment, voice-enabled communications device 106 may include one or more universal serial bus ("USB") ports, one or more Ethernet or broadband ports, and/or any other type of hardwire access port so that communications circuitry 806 allows voice-enabled communications device 106 to communicate with one or more communications networks. Voice-enabled communications device 106 may also include one or more microphones 808 and/or transducers. Microphone(s) 808 may be any suitable component capable of detecting audio signals. For example, microphone(s) 808 may include one or more sensors for generating electrical signals and circuitry capable of processing the generated electrical signals. In some embodiments, microphone(s) 808 may include multiple microphones capable of detecting various frequency levels. As an illustrative example, voice-enabled communications device 106 may include multiple microphones (e.g., four, seven, ten, etc.) placed at various positions about voice-enabled communications device 106 to monitor/capture any audio outputted in the environment where voice-enabled communications device 106 is located. The various microphones 808 may include some microphones optimized for distant sounds, while some microphones may be optimized for sounds occurring within a close range of voice-enabled communications device 106. Voice-enabled communications device 106 may further include one or more speakers 810. Speaker(s) 810 may correspond to any suitable mechanism for outputting audio signals. For example, speaker(s) 810 may include one or more speaker units, transducers, arrays of speakers, and/or arrays of transducers that may be capable of broadcasting audio signals and or audio content to a surrounding area where voice-enabled communications device 106 may be located. In some embodiments, speaker(s) 810 may include headphones or ear buds, which may be wirelessly wired, or hard-wired, to voice-enabled communications device 106, that may be capable of broadcasting audio. In some embodiments, one or more microphones 808 may serve as input devices to receive audio inputs, such as speech. Voice-enabled communications device 106, may then also include one or more speakers 810 to output audible responses. In this manner, voice-enabled communications device 106 may function solely through speech or audio, without the use or need for any input mechanisms or displays. In one exemplary embodiment, voice-enabled communications device 106 includes I/O interface 812. The input portion of I/O interface 812 may correspond to any suitable mechanism for receiving inputs from a user of voice-enabled communications device 106. For example, a camera, keyboard, mouse, joystick, or external controller may be used as an input mechanism for I/O interface 812. The output portion of I/O interface 812 may correspond to any suitable mechanism for generating outputs from voice-enabled communications device 106. For example, one or more displays may be used as an output mechanism for I/O interface 812. As another example, one or more lights, light emitting diodes ("LEDs"), or other visual indicator(s) may be used to output signals via I/O interface 812 of voice-enabled communications device 106. In some embodiments, one or more vibrating mechanisms or other haptic features may be included with I/O interface 812 to provide a haptic response to user 106 from voice-enabled communications device 106. Persons of ordinary skill in the art will recognize that, in some embodiments, one or more features of I/O interface 812 may be included in a purely voice-enabled version of voice communications device 106. For example, one or more LED lights may be included on voice-enabled communications device 106 such that, when microphone(s) 808 receive audio from the user, the one or more LED lights become illuminated signifying that audio has been received by voice-enabled communications device 106. In some embodiments, I/O interface 812 may include a display screen and/or touch screen, which may be any size and/or shape and may be located at any portion of voice-enabled communications device 106. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display screen including capacitive sensing panels capable of recognizing touch inputs thereon. FIG. 8 also includes backend server 866, as mentioned previously, which may be in communication with voice-enabled communications device 106. Backend server 866 (e.g., part of a resource provider environment) includes various components and modules including, but not limited to, automatic speech recognition ("ASR") module 858 (which may include, for example, speech-to-text ("STT") functionality), natural language understanding ("NLU") module 860, applications module 862, and text-to-speech ("TTS") module 864..In some embodiments, backend server 866 may also include computer readable media, including, but not limited to, flash memory, random access memory ("RAM"), and/or read-only memory ("ROM"). Backend server 866 may also include various modules that store software, hardware, logic, instructions, and/or commands, such as, a speaker identification ("ID") module, a user profile module, or any other module, or any combination thereof. The speech-to-text functionality and text-to-speech functionality may be combined into a single module capable of performing both STT and TTS processing, or separate TTS and STT modules may, alternatively, be used. ASR module 858 may be configured such that it recognizes human speech in detected audio, such as audio captured by voice-enabled communications device 106, which is then sent to backend server 866. ASR module 858 may include, in one embodiment, one or more processor(s) 852, storage/memory 854, and communications circuitry 856. Processor(s) 852, storage/memory 854, and communications circuitry 856 may, in some embodiments, be substantially similar to processor(s) 802, storage/memory 804, and communications circuitry 806, which are described in greater detail above, and the aforementioned descriptions of the latter may apply. NLU module 860 may be configured such that it determines user intent based on the detected audio received from voice-enabled communications device 106. NLU module 860 may include processor(s) 852, storage/memory 854, and communications circuitry 856. Applications module 862 may, for example, correspond to various action specific applications or servers capable of processing various task specific actions. Applications module 862 may further correspond to first party applications and/or third party applications operable to perform different tasks or actions. For example, based on the context of audio received from voice-enabled communications device 106, backend server 866 may use a certain application to perform an action, such refining an active play queue of media content. Applications module 862 may include processor(s) 852, storage/memory 854, and communications circuitry 856. As an illustrative example, applications module 862 may correspond to a media service. The electronic media service application of the applications module 862 can be associated with a customer account. The customer account can include at least one profile stored in, for example, user information that can be linked to the electronic media service application in applications module 862. Audio input data can be received at automatic speech recognition module 858 from voice communications device 106. The automatic speech recognition module 858 can use automatic speech recognition (ASR) techniques on the audio input data to generate text data of the audio input data. The natural language understanding module 860 can use natural language understanding (NLU) techniques on the text data to determine refinement/attribute information to manage the active play queue. The electronic media service application of the applications module 862 can receive information that can be used to refine or otherwise control the playback of media content, where refining the playback of media content can include filtering media content from an active play queue of media content, adding media content to the active play queue of media content, re-ordering the sequence of content in the play-queue, supplementing the active play queue, and/or changing the frequency of playback of content in the play-queue. In accordance with an embodiment, the application can determine whether there is an active play queue of media content configured to play on the voice communications device, such as a playlist of music, a station of music, a mix of songs, etc. In the situation where there is no media content being played by the voice communications device or no active play queue of media content, the electronic media service application determines media content using information in the request. The information can be used to search a catalog of media content to identify media content in response to the spoken question or request. For example, the information can be used to identify media content associated with a mood, a tempo, a genre, an artist, a year, a decade, an activity as well as any other topic or interest. The identified media can thereafter be played using the voice communications device. In the situation where there is an active play queue of media content, the information can be used to refine the play queue. For example, the information can include instructions such as refinement instructions that can be used to filter the play queue and/or add media content to the play queue from a catalog of media content. In various embodiments, the user can further refine the playback of media content. For example, in the situation where the user is engaging in a multi-turn dialog interaction with the voice communications device, where the user sends multiple requests to the voice communications device to refine the media playing, the user can first instruct the device to play "happy" music. If the user desires "happier" music, the user can instruct the voice communications device to play "happier" music. TTS module 864 may employ various text-to-speech techniques. It should be noted that techniques for taking text and converting it into audio input data that can represent speech are well known in the art and need not be described in further detail herein, any suitable computer implemented techniques may be used. TTS module 864 may also include processor(s) 852, storage/memory 854, and communications circuitry 856. Persons of ordinary skill in the art will recognize that although each of ASR module 858, NLU module 860, applications module 862, and TTS module 864 include instances of processor(s) 852, storage/memory 854, and communications circuitry 856, those instances of processor(s) 852, storage/memory 854, and communications circuitry 856 within each of ASR module 858, NLU module 860, applications module 862, and STT/TTS module 864 may differ. For example, the structure, function, and style of processor(s) 852 within ASR module 858 may be substantially similar to the structure, function, and style of processor(s) 852 within NLU module 860, however the actual processor(s) 852 need not be the same entity.

Figure 9:
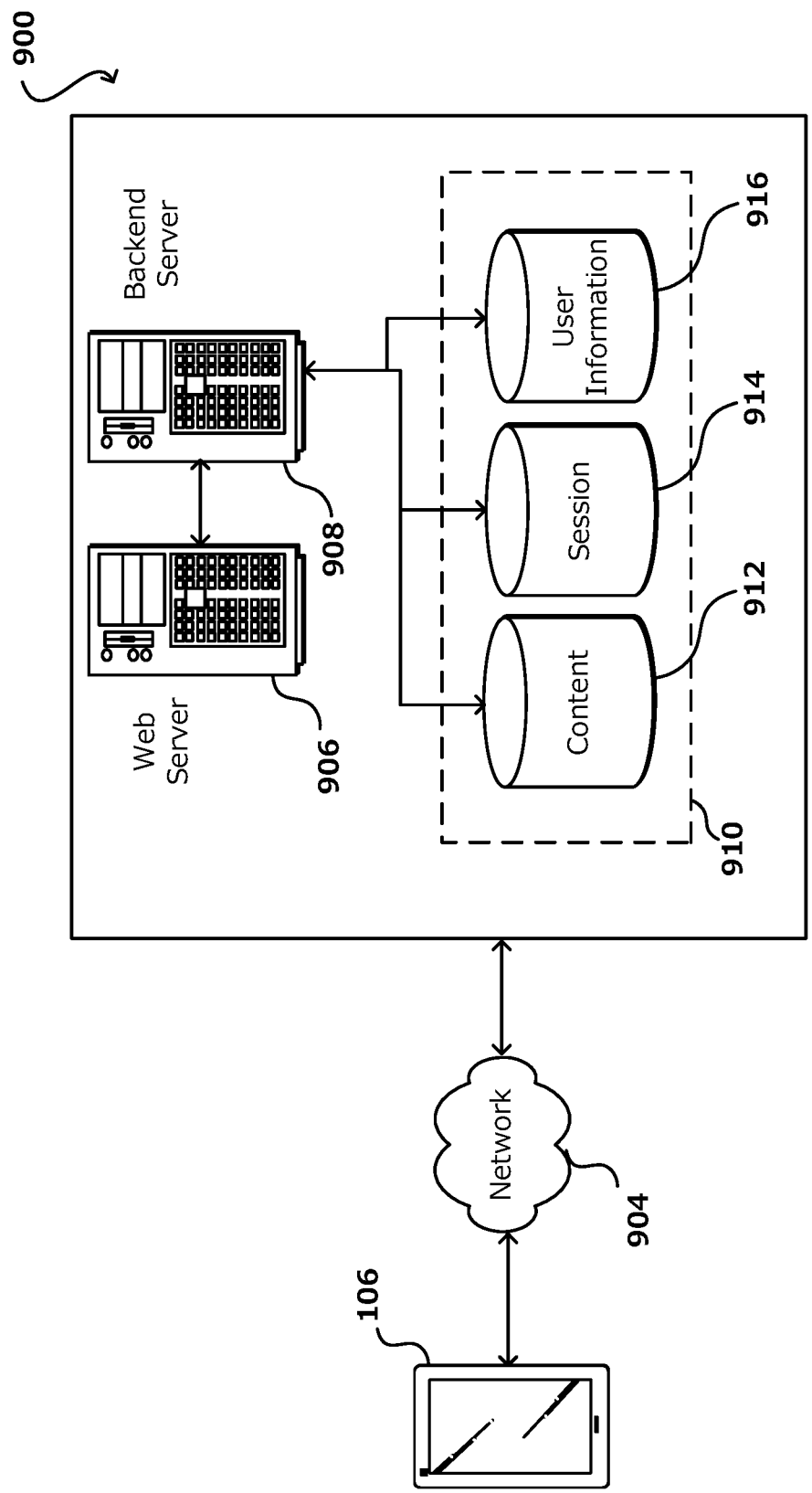
FIG. 9 illustrates an example implementation environment, in accordance with various embodiments of the present disclosure.

In accordance with various embodiments, different approaches can be implemented in various environments in accordance with the described embodiments. For example, FIG. 9 illustrates an example of an environment 900 for implementing aspects in accordance with various embodiments (e.g., a resource provider environment). In accordance with various embodiments, different approaches can be implemented in various environments in accordance with the described embodiments. As will be appreciated, although a Web-based environment is used for purposes of explanation, different environments may be used, as appropriate, to implement various embodiments. The system includes voice communications device 106, which can include any appropriate device operable to send and receive requests, messages or information over network 904 and convey information back to an appropriate device. The network can include any appropriate network, including a telephone network provided by a telecommunication operator, an intranet, the Internet, a cellular network, a local area network, wireless network, or any other such network or combination thereof. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art. The illustrative environment includes at least one backend server 908 and a data store 910. It should be understood that there can be several backend servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The backend server 908 can include any appropriate hardware and software for integrating with the data store 910 as needed to execute aspects of one or more applications for the client device and handling a majority of the data access and business logic for an application. The application server provides access control services in cooperation with the data store and is able to analyze audio date and other data as well as generate content such as text, graphics, audio and/or video to be transferred to the user, which may be served to the user by the Web server 906 in the form of HTML, XML or another appropriate structured language in this example. The handling of all requests and responses, as well as the delivery of content between the voice communications device 106 and the backend server 908, can be handled by the Web server 906. It should be understood that the Web and application servers are not required and are merely example components, as structured code discussed herein can be executed on any appropriate device or host machine as discussed elsewhere herein. The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be other information that may need to be stored in the data store, such as page image information and access rights information, which can be stored in any of the above listed mechanisms as appropriate or in additional mechanisms in the data store 910. The data store 910 is operable, through logic associated therewith, to receive instructions from the backend server 908 and obtain, update or otherwise process data in response thereto. In one such example, the voice communications device can receive a request to refine the playback of media content, such as music, news, audio books, audio broadcasts, and other such content. In this case, the data store might access the user information to verify the identity of the user and access a media service to determine media content the user is associated with. The user's speech can be analyzed and used to generate an updated active play queue or initiate the playback of media content. Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein. The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure. The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network. Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof. In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java, C, C# or C++ or any scripting language, such as Perl, Python or TCL, as well as combinations thereof. The server(s) may also include database servers, including without limitation those commercially available from Oracle, Microsoft, Sybase and IBM. The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display screen or keypad, microphone, camera, etc.) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc. Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, sending and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed. Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
   a display;
   at least one computing device processor; and
   a memory device including instructions that, when executed by the at least one computing device processor, cause the system to:
   determine, based at least in part on data from a user device, a current activity for a user;
   determine, based at least in part on one or more activity rules, that the current activity is an interaction-limiting activity;
   in response to the current activity being an interaction-limiting activity, enable a limited interaction operation mode for the user device, the limited interaction operation mode being different than an operation mode used for non-interaction-limiting activities;
   receive, while the limited interaction operation mode is enabled, an input from the user, the input including audio data representing a user utterance;
   determine, based on the audio data, that the user utterance includes an e-commerce request, wherein the e-commerce request includes an item and a follow on action for completion of the request; and
   determine a complexity level of the follow on action is less than a threshold to permit completion while the limited interaction operation mode is enabled.

2. The system of claim 1, wherein the instructions when executed further cause the system to:
   determine the follow on action is associated with the item, the follow on action including a subsequent action for completing the e-commerce request.

3. The system of claim 2, wherein the instructions when executed further cause the system to:
   determine the follow on action is complex, a complex follow on action having at least a number of queries or an interaction quantity that exceeds a threshold;
   flag the e-commerce request associated with the complex follow on action; and
   prompt the user to complete the follow on action after the user has completed the interaction-limiting activity.

4. The system of claim 2, wherein the instructions when executed further cause the system to:
   determine the follow on action is non-complex, a non-complex follow on action having at least a number of queries or an interaction quantity below the threshold; and
   prompt the user to complete the non-complex follow on action.

5. The system of claim 1, wherein the data for determining the current activity comprises at least one of sensor data of the voice-enabled device, a connection condition of the voice-enabled device, or activity information provided by the user.

6. A computer-implemented method, comprising:
   receiving, at a first time associated with an interaction-limiting activity, an input;
   determining the input includes a request, the request having a follow on action for completion of the request;
   determining a complexity of the follow on action, the complexity based at least in part on a level of interaction associated with the follow on action;
   determining the follow on action is a complex follow on action, the complex follow on action having a level of interaction greater than a threshold;
   flagging the complex follow on action for completion at a second time after completion of the interaction-limiting activity; and
   providing a notification, corresponding to the request, indicating that the complex follow on action is to be completed at the second time.

7. The method of claim 6, further comprising:
   prompting a user, at the second time, to complete the follow on action.

8. The method of claim 6, further comprising:
   determining a second follow on action is a non-complex follow on action;
   transmitting a query, to a user, associated with the non-complex follow on action;
   receiving, from the user, a response to the query; and
   completing the non-complex follow on action.

9. The method of claim 6, further comprising:
   responsive to determining the first time is associated with an interaction-limiting activity, modifying a current operation mode to a limited interaction operation mode for a user device; and
   displaying a notification, associated with the follow on action, using the limited interaction operation mode.

10. The method of claim 6, further comprising:
    receiving a second input including a plurality of voice requests;
    determining at least one second follow on action for at least one of the plurality of voice requests is complex;
    delaying at least one third follow on action for at least one of the plurality of voice requests, the delayed at least one follow on action being non-complex; and
    prompting the user to complete each of the second and third follow on actions at the second time.

11. The method of claim 6, wherein determining the first time is associated with the interaction-limiting activity comprises:
    receiving data from at least one of a sensor, a communication action, or a user, for a current user activity; and
    determining, based on one or more rules associated with the data, that the current user activity is interaction limiting.

12. The method of claim 6, further comprising:
    receiving a current connection status of a user device, the connection status being between the user device and a vehicle system; and determining the current connection status is active.

13. The method of claim 6, wherein the complexity of the follow on action is based at least in part on at least one of a duration of a voice request, historical data, or analysis of the context of a voice request.

14. The method of claim 6, further comprising:
receiving data from at least one of a sensor, a communication action, or a user, for a current user activity; and
determining, based at least in part on one or more rules associated with the data, that the interaction-limiting activity is complete.

15. The method of claim 6, further comprising:
providing a notification, in response to the request, indicating the request is received, the request being transmitted prior to completion of the follow on action.

16. A system, comprising:
at least one computing device processor; and
a memory device including instructions that, when executed by the at least one computing device processor, cause the system to:
receive, at a first time associated with an interaction-limiting activity, an input;
determine the input includes a request, the request having a follow on action for completion of the request;
determine a complexity of the follow on action, the complexity based at least in part on a level of interaction associated with the follow on action;
determine the follow on action is a complex follow on action, the complex follow on action having a level of interaction greater than a threshold;
flag the complex follow on action for completion at a second time after completion of the interaction-limiting activity; and
provide a notification, corresponding to the request, indicating that the complex follow on action is to be completed at the second time.

17. The system of claim 16, wherein the instructions when executed further cause the system to:
determine a second follow on action is a non-complex follow on action;
transmit a query, to a user, associated with the non-complex follow on action;
receive, from the user, a response to the query; and
complete the non-complex follow on action.

18. The system of claim 16, wherein the instructions when executed further cause the system to:
responsive to determining the first time is associated with an interaction-limiting activity, modify a current operation mode to a limited interaction operation mode for a user device; and
display a notification, associated with the follow on action, using the limited interaction operation mode.

19. The system of claim 16, wherein the instructions when executed further cause the system to:
receive a second input including a plurality of voice requests;
determine at least one second follow on action for at least one of the plurality of voice requests is complex;
delay at least one third follow on action for at least one of the plurality of voice requests, the delayed at least one follow on action being non-complex; and
prompt the user to complete each of the second and third follow on actions at the second time.

20. The system of claim 16, wherein the instructions when executed further cause the system to:
receive a current connection status of a user device, the connection status being between the user device and a vehicle system; and
determine the current connection status is active.

* * * * *